(12) United States Patent
Ahn

(10) Patent No.: US 6,936,805 B2
(45) Date of Patent: Aug. 30, 2005

(54) DEVICE AND METHOD FOR FIXING AN OPTICAL WAVELENGTH IN A WAVELENGTH DIVISION MULTIPLEXING SYSTEM

(75) Inventor: June-Hyeon Ahn, Suwon-shi (KR)

(73) Assignee: Samsung Electronics Co., Ltd., Suwon-si (KR)

(*) Notice: Subject to any disclaimer, the term of this patent is extended or adjusted under 35 U.S.C. 154(b) by 11 days.

(21) Appl. No.: 10/337,130

(22) Filed: Jan. 6, 2003

(65) Prior Publication Data

US 2003/0138199 A1 Jul. 24, 2003

(30) Foreign Application Priority Data

Jan. 18, 2002 (KR) .................................. 10-2002-0003005

(51) Int. Cl.⁷ ............................ G01J 1/32; G02B 6/26
(52) U.S. Cl. ..................... 250/205; 250/226; 385/39; 385/90; 359/889
(58) Field of Search ................................. 250/205, 226, 250/227.11, 239; 385/9, 27, 31, 39, 52, 88, 90, 92; 359/889

(56) References Cited

U.S. PATENT DOCUMENTS 5,966,987 A * 10/1999 Yoon et al. ................ 74/89.23
2003/0133650 A1 * 7/2003 Hakimi et al. ............... 385/27

* cited by examiner

Primary Examiner—Kevin Pyo
(74) Attorney, Agent, or Firm—Cha & Reiter, LLC.

(57) ABSTRACT

A filter device for transmitting an optical signal using multiple wavelengths is disclosed. The filter device includes a fixation unit fixed to a substrate, a rotation unit having a filter rotatably installed on the fixation unit, and a control means for obtaining a predetermined wavelength by controlling the rotation angle of the filter through gear combinations corresponding positions of the fixation unit and the rotation unit. The alignment and fixation of the filter are controlled simultaneously through the gearing combinations between the gear teeth on the guide rib of the rotation unit and the teeth of the spur gear fixed to the bolt.

11 Claims, 5 Drawing Sheets

DEVICE AND METHOD FOR FIXING AN OPTICAL WAVELENGTH IN A WAVELENGTH DIVISION MULTIPLEXING SYSTEM

CLAIM OF PRIORITY

This application claims priority to an application entitled "DEVICE FOR FIXING OPTICAL WAVELENGTH IN WAVELENGTH DIVISION MULTIPLEXING," filed in the Korean Industrial Property Office on Jan. 18, 2002 and assigned Serial No. 02-3005, the contents of which are hereby incorporated by reference.

BACKGROUND OF THE INVENTION

1. Field of the Invention

The present invention relates generally to a system for transmitting an optical signal using multiple wavelengths, such as a wavelength division multiplexing (WDM) system. More particularly, the present invention relates to a device and method for fixing an optical wavelength in a WDM system that can fix the optical wavelength generated by a laser diode (LD).

2. Description of the Related Art

In general, optical communication technology is at a state where an optical fiber can transmit a large capacity of information at a high data rate and prevent a signal defect or cross-talk resulting from electromagnetic flux. Accordingly, it has been applied in various different applications. In addition, communication capacity has increased many fold due to development of the information field, particularly the internet, and thus there are increasing demands for large capacity optical communication. One way to increase the data rate of an optical signal is to increase the capacity of optical communication, but this technique has failed to satisfy such high demands. As such, there is high demand for transmitting optical data using a WDM system, which transmits a plurality of wavelengths through a single optical fiber.

In the WDM system, a plurality of wavelengths has its own wavelength properties and interfere with each other according to the corresponding wavelength properties. The corresponding wavelengths must be fixed by a special device in order to prevent their mutual interferences. The WDM system has a different structure from a general time-division-multiplexing (TDM) system, which does not multiplex the wavelength and consequently does not require fixing the wavelength of the LD.

As described above, the WDM system requires a filter device to filter a light having a predetermined wavelength existing within the spectrum of the light emitted by the LD. The filter device includes a filter for passing the predetermined optical wavelength through, and the filter is adhered and fixed in a certain position by way of soldering, laser welding, or epoxy bonding.

However, when the filter is aligned and fixed as mentioned above, an alignment device is required for angle alignment, and at least one high-priced integrated process is necessary for filter fixation (soldering, laser welding and epoxy bonding). Further, in the case where the alignment and fixation are individually performed, at least two processes are necessary, which increases device dependency and fabrication expenses.

SUMMARY OF THE INVENTION

Therefore, the present invention relates to a device and method for fixing an optical wavelength in a WDM system in order to prevent wavelength interference in the light emitted by a LD to maximize optical data transmission without defect.

According to one aspect of the invention, in order to further minimize costs and device dependency, the inventive system is capable of aligning and fixing a filter with a minimum number of processes and devices.

According to another aspect of the invention, the inventive system is capable of easily aligning a filter at a desired angle even if alignment and fixation are individually performed.

Accordingly, there is provided a device for fixing an optical wavelength in a wavelength division multiplexing system including: a light source; a filter device for passing a predetermined wavelength through, the wavelength existing within the spectrum of light emitted by the light source; a photodiode for sensing the light filtered by the filter device and generating a corresponding electrical signal; and, a laser diode controller for driving the light source by comparing the electrical signals generated by the photodiode with the signals emitted by the light source and for outputting a control signal according to the comparison result. The filter device includes a fixation unit fixed to a substrate, a rotation unit having a filter rotatably installed on the fixation unit, and a control means for obtaining a predetermined wavelength by controlling a rotation angle of the filter through gear combinations matching corresponding positions of the fixation unit and the rotation unit.

BRIEF DESCRIPTION OF THE DRAWINGS

The above and other features and advantages of the present invention will become more apparent from the following detailed description when taken in conjunction with the accompanying drawings in which.

DETAILED DESCRIPTION OF THE PREFERRED EMBODIMENT

In accordance with the present invention, a device for fixing an optical wavelength includes a filter device for passing an optical signal having a predetermined wavelength existing within the spectrum of the light emitted by a light source, such as an LD or distributed feedback laser diode (DFB-LD) in a WDM system using multiple wavelengths. Further, the user can directly control the angle of the filter by using an angle control means to obtain a light having a predetermined wavelength.

In the embodiment, a gearing system driven by matching a rotation unit having a filter with a fixation unit on which the rotation unit is installed is used as the angle control means. The rotation unit having gear teeth on at least one end meshed with the teeth of a gear fixed in the fixation unit.

The angle can be more precisely controlled by adjusting the number of gear teeth.

Now, a preferred embodiment of the present invention will be described herein below with reference to the accompanying drawings. For the purposes of clarity and simplicity, well-known functions or constructions, for example, a micro-lens, focusing lens or splitter positioned among the light source, filter device and photodiode are not described in detail as they would obscure the invention in unnecessary detail.

Figure 1:
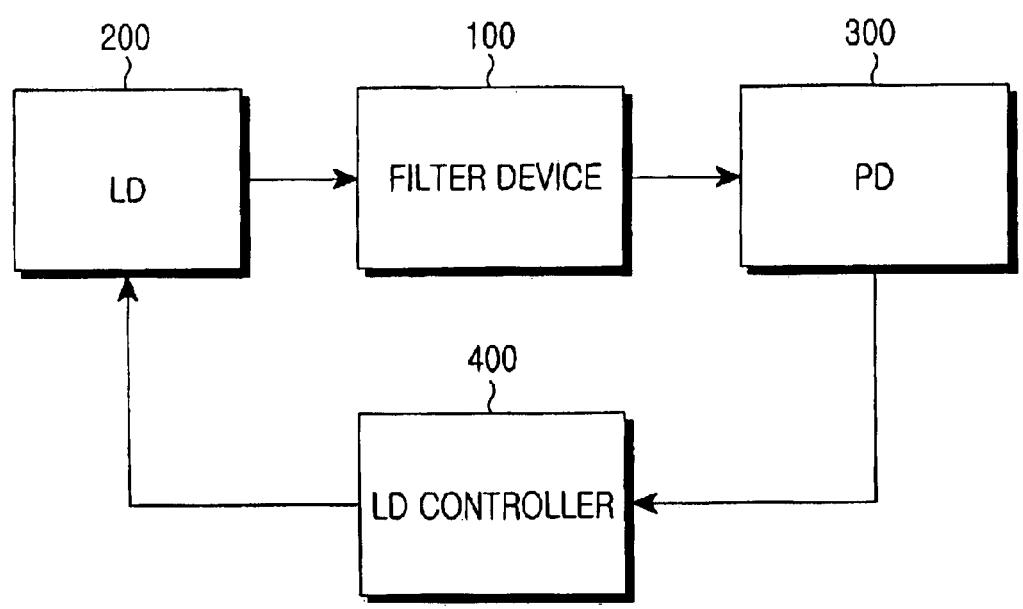
FIG. 1 is a block diagram illustrating a general device for fixing an optical wavelength.

FIG. 1 is a block diagram whereto the to the embodiment of the present invention is applicable. As shown, the device for fixing a wavelength includes an LD 200 used as a light source; a filter device 100 for passing a predetermined wavelength existing within the spectrum of the light emitted by the LD 200; a photodiode 300 for sensing the light filtered by the filter device 100 and generating a corresponding electrical signal; and; an LD controller 400 for driving the LD 200 by comparing the electrical signals generated by the photodiode 300 with the signals emitted by the LD 200 and for outputting a control signal according to the comparison result. That is, the LD controller 400 outputs the control signal for increasing or decreasing the output power of the LD 200 according to the power difference between the signal output from the LD 200 and the signal output from the photodiode 300.

In the device for fixing the wavelength, light having a predetermined wavelength is emitted by the LD 200, which is used as the light source, and light having a predetermined wavelength passes through the filter device 100. That is, the wavelength passing through the filter can be predetermined so that the predetermined wavelength will pass through the filter device 100. Thereafter, the filtered light is transmitted to the photodiode 300. The photodiode 300 generates the electrical signal according to the quantity of the irradiated light and inputs it to the LD controller 400. The LD controller 400 outputs the control signal to drive the LD 200. That is, the user fixes the wavelength of the emitted light at a predetermined wavelength through this continuous feedback operation.

Figure 2:
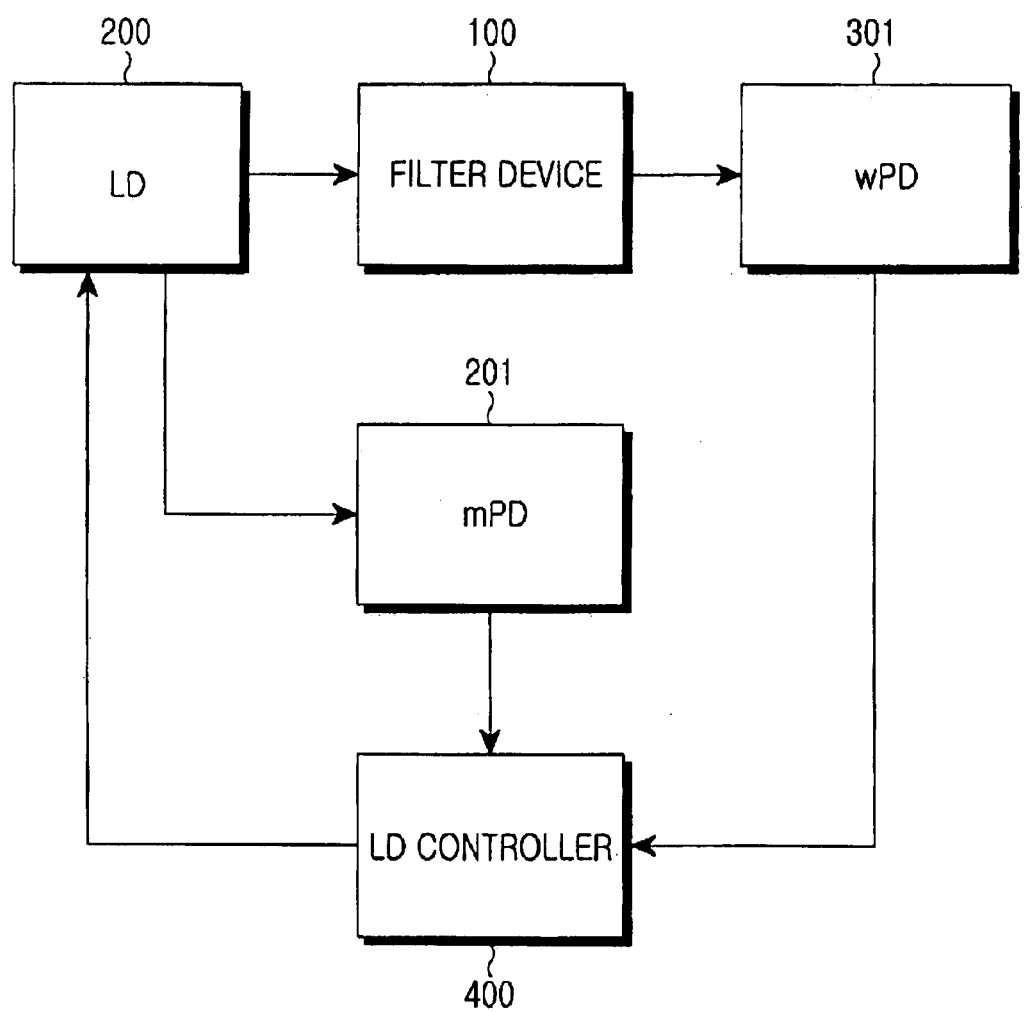
FIG. 2 is another block diagram illustrating a general device for fixing an optical wavelength.

FIG. 2 is another block diagram whereto the to the embodiment of the present invention is applicable. As shown, the device for fixing a wavelength includes an mPD(monitoring PD) 201 for detecting a signal output from a LD 200 and wPD(wavelength PD) 301 for detecting a signal output from a filter 100. In operation, an optical signal output from the LD 200 is detected by the mPD 201, whereas the signal output from the filter 100 is detected by the wPD 301. Then, the signals detected by the mPD 201 and the wPD 301 are compared by the LD controller 400, and a signal controlling LD 200 is generated according to the compared result. That is, the LD controller 400 outputs the control signal for increasing or decreasing the output power of the LD 200 according to the power difference between the signal output from the mPD 201 and the signal output from the wPD 301.

Figure 3:
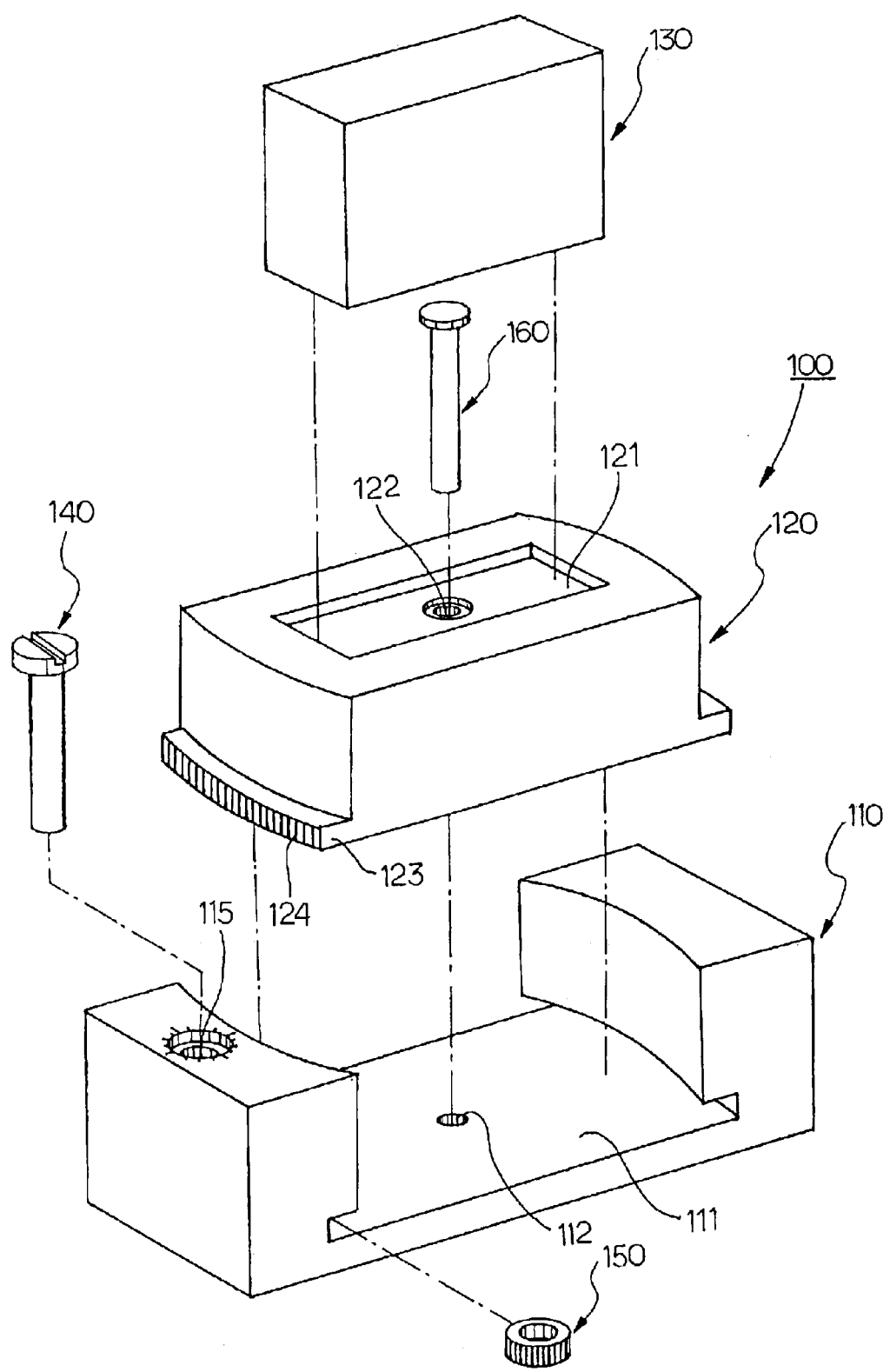
FIG. 3 is a perspective diagram illustrating the disassembled state of a filter device of a device for fixing an optical wavelength in accordance with the preferred embodiment of the present invention.
Figure 4:
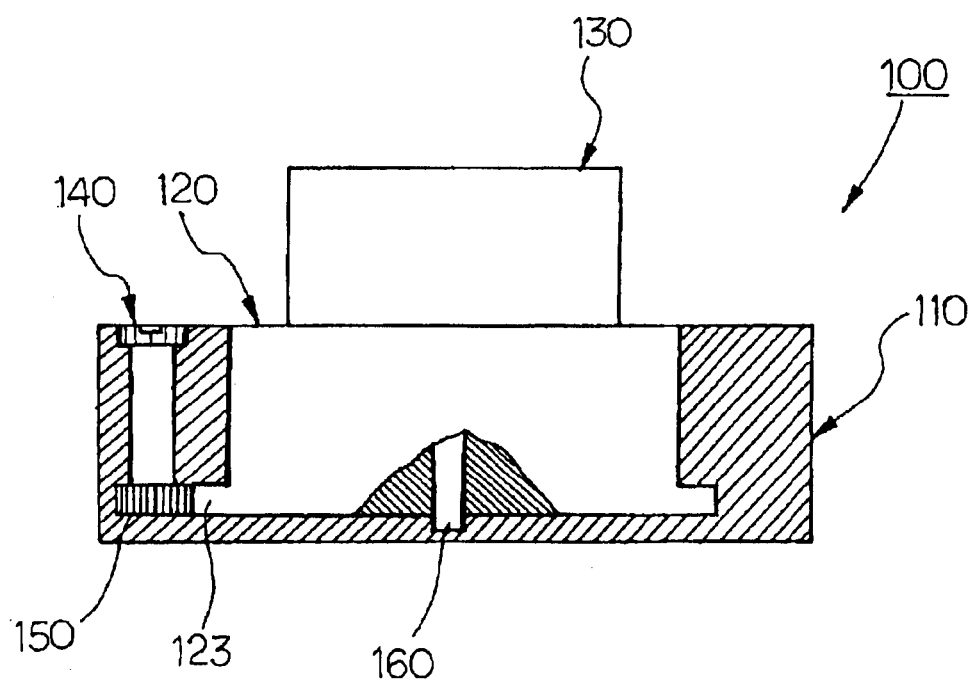
FIG. 4 is a cross-sectional diagram illustrating the assembled state of the filter device in accordance with the preferred embodiment of the present invention; and, FIG. 5 is an operation diagram illustrating the filter device in accordance with the preferred embodiment of the present invention.

FIG. 3 is a perspective diagram illustrating the disassembled state of the filter device 100 for fixing the wavelength in accordance with the preferred embodiment of the present invention. FIG. 4 is a cross-sectional diagram illustrating the assembled state of the filter device 100 in accordance with the preferred embodiment of the present invention. Note that the angle of the filter can be controlled to align the device for fixing the wavelength and for fixing the filter at the same time.

The filter device 100 for fixing the wavelength includes a fixation unit 110 fixed to a semiconductor substrate, a rotation unit 120 having a filter 130 rotatably installed on the fixation unit 110, and a control means for controlling an angle of the filter 130 to obtain a predetermined wavelength by rotating the rotation unit 120 installed on the fixation unit 110.

The fixation unit 110 has a rotation unit mounted surface 111 at its center portion so that the rotation unit 120 can be stably mounted and rotated thereon. In addition, a shaft 160 passing through the rotation unit 120 and fixed to the rotation unit mounted surface 111 of the fixation unit 110 can be employed, so that the rotation unit 120 can be smoothly rotated on the fixation unit 110. That is, a shaft through hole 122 is formed at the center portion of the rotation unit 120, and an insertion groove 112 which the end of the shaft 160 passing through the rotation unit 120 is inserted into is formed on the rotation unit mounted surface 111 of the fixation unit 110 corresponding to the shaft through hole 122. Accordingly, the rotation unit 120 is rotatably installed on the fixation unit 110 with the central axis of shaft 160 passing through the rotation unit. Preferably, a groove-shaped filter fixed surface 121 for fixing the filter 130 is formed on the top surface of the rotation unit 120, the shaft through hole 122 is formed on the filter fixed surface 121, and the filter 130 is fixed to the filter fixed surface 121 after the shaft 160 is fixed.

A guide rib 123 is protrusively formed on one side surface of the rotation unit 120, and a guide slit 113 which the guide rib 123 is inserted into is formed on one sidewall of the rotation unit mounted surface 111 of the fixation unit 110. The outer circumferential surface of the guide rib 123 and the surface of the guide slit 113 contacting the outer circumferential surface can be curved to easily rotate the rotation unit 120 on the fixation unit 110. In addition, the guide slit 113 and the guide rib 123 can be respectively formed at both sides of the fixation unit 110 and the rotation unit 120.

The control means includes a plurality of gear teeth 124 formed on the outer circumferential surface of the guide rib 123 of the rotation unit 120, a spur gear 150 installed in a proper position of the guide slit 113 and meshed with the teeth 124 of the guide rib 123, and a bolt 140 passing from the top of the fixation unit 110 to the spur gear 150 and rotated with the spur gear 150. Therefore, when the bolt 140 is rotated by using a tool such as a driver, the spur gear 150 is rotated, the guide rib 123 matched with the spur gear 150 is also rotated, thus the rotation unit 120 is rotated on the fixation unit 110 to a predetermined angle. As a result, the angle of the filter 130 fixed to the rotation unit 120 is controlled by rotating the rotation unit 120 to a predetermined angle.

In another embodiment, the control means fixed to the spur gear 150, may be a lever or shaft protruded from the fixation unit 110 that can replace the bolt 140. In addition, scales for angular measurement are formed around a through hole 115 which the bolt 140 of the fixation unit 110 passes through, so that the user can easily control the angle of the rotation unit 120 rotated due to rotation of the bolt 140 or other control means.

Moreover, the number of teeth 124 on the guide rib 123 or the diameter or the number of teeth of the spur gear 150 can be adjusted to more easily and precisely control the angle of the filter.

Figure 5:
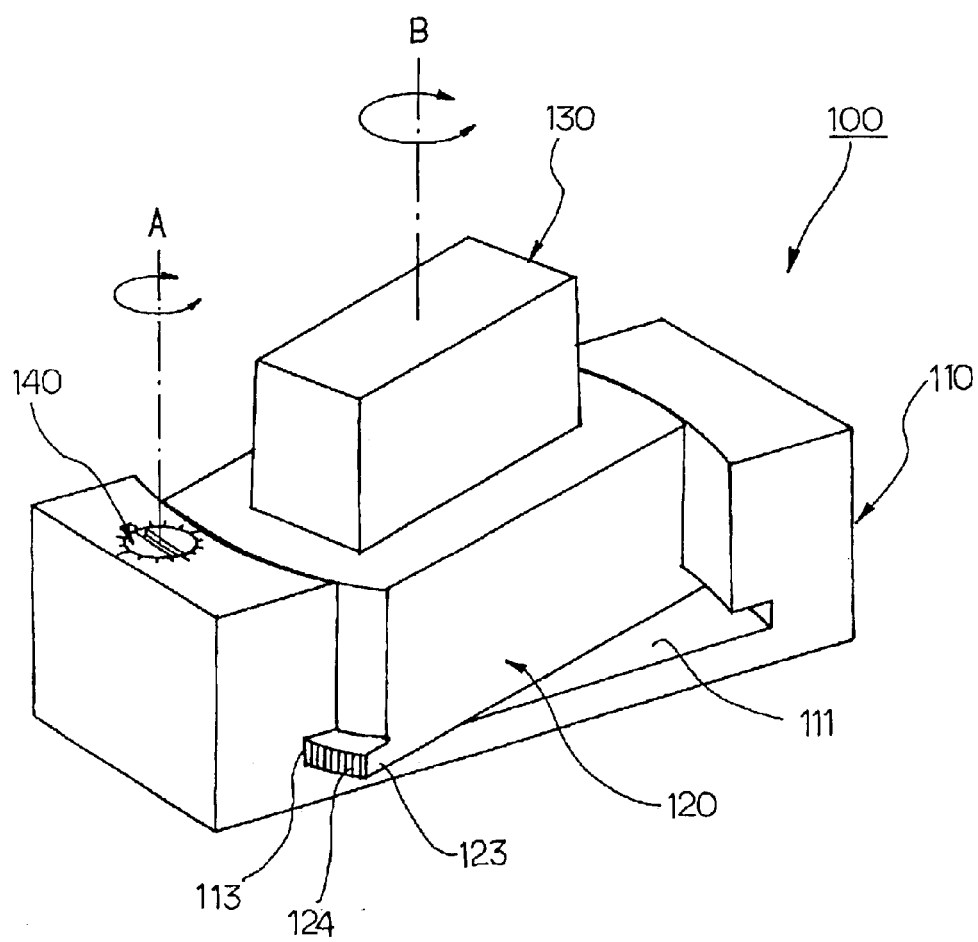

FIG. 5 is an operation diagram illustrating the filter device in accordance with the preferred embodiment of the present invention. When the bolt 140 rotatably installed in the fixation unit 110 is rotated about axis A by using a tool (not shown) such as a driver, the spur gear (150 of FIG. 3 and FIG. 4) fixed to the end of the bolt 140 is also rotated. The gear teeth 124 formed on the guide rib 123 of the rotation unit 120 which are meshed with the spur gear 150 are thusly rotated to a predetermined angle due to rotation of the spur gear 150. Accordingly, the user can rotate the filter 130 fixed to the rotation unit 120 on axis B to an angle for obtaining a predetermined wavelength.

In accordance with the present invention, the alignment and fixation of the filter are controlled simultaneously through the gearing combinations between the gear teeth 124 on the guide rib 123 of the rotation unit 120 and the teeth of the spur gear 150 fixed to the bolt 140. Consequently, the fabrication process is simplified and the production time and costs are minimized.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A device for fixing an optical wavelength in a wavelength division multiplexing system, comprising:
    a light source;
    a filter device coupled to said light source for passing a predetermined wavelength there through, said wavelength existing in the spectrum of light emitted by said light source, said filter device including:
    a fixation unit fixed to a substrate;
    a rotation unit having a filter and being rotatably installed on said fixation unit; and,
    a control means for obtaining a predetermined wavelength by rotating said rotation unit installed on said fixation unit to a predetermined angle;
    a photodiode for sensing said wavelength passing through said filter device and generating a corresponding electrical signal; and,
    a laser diode controller for driving said light source by comparing said electrical signals generated by said photodiode with the signals emitted by said light source and for outputting a control signal to the light source according to the comparison result, wherein the control means controls a rotation angle through gear combinations of gears having planarly meshed teeth, said combinations corresponding to relative positions of said fixation unit to said rotation unit.

2. The device as claimed in claim 1, wherein a rotation unit mounted surface is formed at a center portion of said fixation unit so that said rotation unit can be stably mounted and rotated thereon.

3. A device for fixing an optical wavelength in a wavelength division multiplexing system, comprising:
    a light source;
    a filter device coupled to said light source for passing a predetermined wavelength there through, said wavelength existing in the spectrum of light emitted by said light source, said filter device including:
    a fixation unit fixed to a substrate;
    a rotation unit having a filter and being rotatably installed on said fixation unit; and,
    a control means for obtaining a predetermined wavelength by rotating said rotation unit installed on said fixation unit to a predetermined angle;
    a photodiode for sensing said wavelength passing through said filter device and generating a corresponding electrical signal; and,
    a laser diode controller for driving said light source by comparing said electrical signals generated by said photodiode with the signals emitted by said light source and for outputting a control signal according to the comparison result;
    wherein the control means controls a rotation angle through gear combinations corresponding to relative positions of said fixation unit to said rotation unit; and
    wherein said control means comprises:
    a guide rib having teeth at its end at a predetermined interval and being protrusively formed on one side surface of said rotation unit;
    a guide slit formed on one sidewall of said rotation unit mounted surface of said fixation unit so that said guide rib can be inserted thereto;
    a spur gear inserted into a proper position of said guide slit and meshed with the teeth of said guide rib; and,
    a bolt passing from the top of said fixation unit into the guide slit and rotatably fixed to said spur gear.

4. The device as claimed in claim 3, further comprising a shaft passing vertically through a center portion of said rotation unit and fixed to the mounted surface of said fixation unit.

5. The device as claimed in claim 4, wherein said shaft serves as a rotation axis for rotating said rotation unit on said fixation unit.

6. The device as claimed in claim 5, wherein the outer circumferential surface of said guide rib and the surface of said guide slit contacting the outer circumferential surface are curved to allow the rotation of said rotation unit on said fixation unit.

7. The device as claimed in claim 6, wherein the outer contact surface of said rotation unit and corresponding contact surface of said fixation unit are curved to allow the rotation of said rotation unit on said fixation unit.

8. A method for fixing an optical wavelength in a wavelength division multiplexing system, the method comprising the steps of:
    providing optical signals from a light source;
    filtering a predetermined wavelength from the optical signals of said light source, said filtering comprising the steps of:
        selecting a pair from among gears that have respective gear ratios when arranged so that the teeth of a pair mesh planarly; and
        rotating a bolt fixed to a gear of the pair, which in turn rotates a filter to a predetermined angle for permitting a predetermined wavelength to pass there through;
    sensing the filtered predetermined wavelength to generate corresponding electrical signals; and,
    comparing the generated electrical signals with the optical signals from said light source and outputting a control signal to the light source according to the comparison result, which in turn drives said light source.

9. A device for fixing an optical wavelength in a wavelength division multiplexing system, comprising:
    a light source;
    a filter device for passing a predetermined wavelength through, said wavelength existing in the spectrum of light emitted by said light source said filter device including:
    a fixation unit fixed to a substrate;
    a rotation unit having a filter and being rotatably installed on said fixation unit and being capable of rotation thereon; and a control means for obtaining a predetermined wavelength by controlling a rotation angle of said filter through gear ratios of respective planarly-meshed gear combinations corresponding to relative positions of said rotation unit to said fixation unit;

a photodiode for sensing the light filtered by the filter device and generating a corresponding electrical signal; and, a laser diode controller for driving said light source by comparing the electrical signals generated by said photodiode with the signals emitted by said light source and for outputting a control signal to the light source according to the comparison result.

10. A device for fixing an optical wavelength in a wavelength division multiplexing system, comprising:

a light source;

a filter device for passing a predetermined wavelength through, said wavelength existing in the spectrum of light emitted by said light source said filter device including:

a fixation unit fixed to a substrate;

a rotation unit having a filter and being rotatably installed on said fixation unit and being capable of rotation thereon; and a control means for obtaining a predetermined wavelength by controlling a rotation angle of said filter through gear combinations corresponding to relative positions of said rotation unit to said fixation unit;

a photodiode for sensing the light filtered by the filter device and generating a corresponding electrical signal; and, a laser diode controller for driving said light source by comparing the electrical signals generated by said photodiode with the signals emitted by said light source and for outputting a control signal to the light source according to the comparison result, wherein a rotation unit mounted surface is formed at the center portion of said fixation unit so that said rotation unit can be stably mounted and rotated thereon.

11. A device for fixing an optical wavelength in a wavelength division multiplexing system, comprising:

a light source;

a filter device for passing a predetermined wavelength through, said wavelength existing in the spectrum of light emitted by said light source said filter device including:

a fixation unit fixed to a substrate;

a rotation unit having a filter and being rotatably installed on said fixation unit and being capable of rotation thereon; and a control means for obtaining a predetermined wavelength by controlling a rotation angle of said filter through gear combinations corresponding to relative positions of said rotation unit to said fixation unit;

a photodiode for sensing the light filtered by the filter device and generating a corresponding electrical signal; and, a laser diode controller for driving said light source by comparing the electrical signals generated by said photodiode with the signals emitted by said light source and for outputting a control signal according to the comparison result;

wherein a rotation unit mounted surface is formed at the center portion of said fixation unit so that said rotation unit can be stably mounted and rotated thereon; and wherein said control means comprises:

a guide rib having teeth at its end at a predetermined interval and being protrusively formed on one side surface of the rotation unit;

a guide slit formed on one sidewall of the rotation unit mounted surface of the fixation unit so that said guide rib can be inserted thereto;

a spur gear inserted into a proper position of said guide slit and matched with the teeth of said guide rib; and, a bolt passing from the top of said fixation unit into said guide slit and rotatably fixed to said spur gear.

* * * * *